US011285803B2

(12) United States Patent
May

(10) Patent No.: US 11,285,803 B2
(45) Date of Patent: Mar. 29, 2022

(54) FILL LEVEL VALVE FOR A PRESSURE EQUALIZATION LINE OF A FLUID TANK ASSEMBLY AND CORRESPONDING FLUID TANK ASSEMBLY

(71) Applicant: AFT AUTOMOTIVE GMBH, Greven-Reckenfeld (DE)

(72) Inventor: Thomas May, Steinfurt (DE)

(73) Assignee: AFT AUTOMOTIVE GMBH, Greven-Reckenfeld (DE)

( * ) Notice: Subject to any disclaimer, the term of this patent is extended or adjusted under 35 U.S.C. 154(b) by 50 days.

(21) Appl. No.: 16/768,164

(22) PCT Filed: Nov. 21, 2018

(86) PCT No.: PCT/EP2018/082070
§ 371 (c)(1),
(2) Date: May 29, 2020

(87) PCT Pub. No.: WO2019/105823
PCT Pub. Date: Jun. 6, 2019

(65) Prior Publication Data
US 2020/0376955 A1    Dec. 3, 2020

(30) Foreign Application Priority Data
Nov. 30, 2017    (DE) .................... 10 2017 221 596.8

(51) Int. Cl.
*B60K 15/035*    (2006.01)
*F16K 24/04*    (2006.01)
*B60K 15/03*    (2006.01)

(52) U.S. Cl.
CPC ...... *B60K 15/03519* (2013.01); *F16K 24/044* (2013.01); *B60K 2015/03289* (2013.01);
(Continued)

(58) Field of Classification Search
CPC .......... B60K 2015/03289; B60K 2015/03368; B60K 2015/03538; B60K 2015/03576;
(Continued)

(56) References Cited

U.S. PATENT DOCUMENTS 540,760 A  *  6/1895  Sawyer ................. F24D 19/081
                                                                137/198
950,533 A  *  3/1910  Hilliard ................. F24D 19/081
                                                                137/198
(Continued)

FOREIGN PATENT DOCUMENTS

| DE | 10 2013 018 194 A1 | 4/2014 |
|----|--------------------|--------|
| DE | 10 2013 013 213 A1 | 2/2015 |
| GB | 2544004 A          | 5/2017 |

OTHER PUBLICATIONS

International Search Report from Corresponding International Application No. PCT/EP2018/082070 dated Feb. 27, 2019.
(Continued)

*Primary Examiner* — Timothy L Maust
*Assistant Examiner* — James R Hakomaki
(74) *Attorney, Agent, or Firm* — Pearne & Gordon LLP

(57) ABSTRACT

The application relates to a fill level valve for a pressure equalization line of a fluid tank assembly, wherein the pressure equalization line is fluidically connected between a fluid tank and a filling line opening into the fluid tank, and wherein the fill level valve includes a connecting piece which can be arranged on the fluid tank. It is provided here that a dip tube, which can be arranged in the fluid tank, and which is fluidically connected to the connecting piece, originates from the connecting piece, wherein a flow resistance formed by a constricted flow cross section is provided in the dip tube. The application furthermore relates to a fluid tank assembly.

10 Claims, 5 Drawing Sheets

(52) U.S. Cl.
CPC ............... *B60K 2015/03368* (2013.01); *B60K 2015/03538* (2013.01); *B60K 2015/03576* (2013.01)

(58) Field of Classification Search
CPC ........ B60K 2015/03552; B60K 15/035; F16K 24/044
USPC .......................................................... 137/202
See application file for complete search history.

(56) References Cited

U.S. PATENT DOCUMENTS

| | | | |
|---|---|---|---|
| 3,152,604 A * | 10/1964 | Frye | F16K 24/042 |
| | | | 137/202 |
| 4,376,446 A * | 3/1983 | Lift | B60K 15/03519 |
| | | | 137/202 |
| 4,974,645 A | 12/1990 | Johnson | |
| 4,991,615 A * | 2/1991 | Szlaga | B60K 15/03519 |
| | | | 137/202 |
| 5,082,016 A * | 1/1992 | Nakamura | B60K 15/03519 |
| | | | 137/202 |
| 5,386,923 A | 2/1995 | Nakashima et al. | |
| 5,413,137 A * | 5/1995 | Gimby | B60K 15/03519 |
| | | | 137/197 |
| 5,449,029 A | 9/1995 | Harris | |
| 5,687,778 A | 11/1997 | Harris | |
| 6,119,712 A * | 9/2000 | Schiebold | F16K 24/044 |
| | | | 137/202 |
| 6,701,950 B2 * | 3/2004 | Brock | B60K 15/03504 |
| | | | 137/202 |
| 6,708,713 B1 | 5/2004 | Gericke | |
| 6,755,206 B2 * | 6/2004 | Nishi | F16K 24/044 |
| | | | 137/202 |
| 6,981,514 B2 * | 1/2006 | Nishi | F16K 24/042 |
| | | | 137/202 |
| 7,418,975 B2 * | 9/2008 | Nojiri | F16K 24/044 |
| | | | 137/202 |
| 7,527,064 B2 * | 5/2009 | Kito | F16K 1/36 |
| | | | 137/202 |
| 7,886,759 B2 * | 2/2011 | Miyoshi | F16K 24/042 |
| | | | 137/202 |
| 7,900,648 B2 * | 3/2011 | Rouxel | F16K 17/36 |
| | | | 137/202 |
| 8,146,570 B2 | 4/2012 | Ishida et al. | |
| 9,333,851 B2 | 5/2016 | Miura et al. | |
| 9,752,695 B2 | 9/2017 | Koukan et al. | |
| 9,903,318 B2 * | 2/2018 | Mihara | F16K 27/07 |
| 10,738,909 B2 * | 8/2020 | Nakaya | F16K 24/044 |
| 2001/0020487 A1 * | 9/2001 | Rosseel | B60K 15/03519 |
| | | | 137/202 |
| 2001/0047822 A1 * | 12/2001 | Aoki | F16K 24/044 |
| | | | 137/202 |
| 2005/0126633 A1 | 6/2005 | Leonhardt | |
| 2006/0213555 A1 * | 9/2006 | Miura | F16K 24/044 |
| | | | 137/202 |
| 2007/0186973 A1 * | 8/2007 | Miyoshi | F16K 17/36 |
| | | | 137/41 |
| 2007/0284001 A1 * | 12/2007 | Yamada | F16K 24/044 |
| | | | 137/202 |
| 2009/0000669 A1 * | 1/2009 | Kito | F16K 24/044 |
| | | | 137/202 |
| 2009/0057309 A1 | 3/2009 | Shears | |
| 2010/0186828 A1 * | 7/2010 | Matsuzaki | F16K 24/044 |
| | | | 137/202 |
| 2011/0005614 A1 | 1/2011 | Pifer et al. | |
| 2011/0186149 A1 * | 8/2011 | Tagami | F16K 31/18 |
| | | | 137/409 |
| 2012/0012192 A1 * | 1/2012 | Guba | F16K 24/044 |
| | | | 137/202 |
| 2012/0037834 A1 * | 2/2012 | Lang, III | E03F 5/08 |
| | | | 251/368 |
| 2013/0019963 A1 * | 1/2013 | Sugiura | F16K 24/044 |
| | | | 137/409 |
| 2014/0116537 A1 | 5/2014 | Miura et al. | |
| 2015/0210528 A1 | 7/2015 | Marsala et al. | |
| 2016/0129779 A1 | 5/2016 | Shimokawa | |
| 2016/0201817 A1 | 7/2016 | Koukan et al. | |
| 2017/0274760 A1 | 9/2017 | Mihara | |
| 2017/0363219 A1 | 12/2017 | Koukan et al. | |

OTHER PUBLICATIONS

Written Opinion from Corresponding International Application No. PCT/EP2018/082070 dated Feb. 27, 2018.

* cited by examiner

FILL LEVEL VALVE FOR A PRESSURE EQUALIZATION LINE OF A FLUID TANK ASSEMBLY AND CORRESPONDING FLUID TANK ASSEMBLY

FIELD OF THE INVENTION

The invention relates to a fill level valve for a pressure equalization line of a fluid tank assembly, wherein the pressure equalization line is fluidically connected between a fluid tank and a filling line opening into the fluid tank, and wherein the fill level valve comprises a connecting piece arrangeable on the fluid tank. The invention furthermore relates to a fluid tank assembly.

BACKGROUND OF THE INVENTION

It is an object of the invention to propose a fill level valve which has advantages over known fill level valves, in particular enables a particularly simple adjustability to different fluids.

This is achieved according to the invention by a fill level valve having the features of claim 1. It is provided in this case that a dip tube, which can be arranged in the fluid tank and is fluidically connected to the connecting piece, originates from the connecting piece, wherein a flow resistance formed by a constricted flow cross section is provided in the dip tube.

The fill level valve is used in the scope of the fluid tank assembly. The fluid tank assembly has the fluid tank and the filling line, via which fluid can be decanted into the fluid tank. The filling line thus comprises on its side facing away from the fluid tank, for example, a filling nozzle, which is provided and formed to accommodate a filling device, for example, a dispensing device for fuel. During the decanting of fluid into the fluid tank through the filling line, the fluid level in the fluid tank rises and displaces the air present in the fluid tank. If this air escapes through the filling line in the direction of the filling nozzle, it can thus possibly entrain fluid, so that the fluid sprays out of the filling nozzle.

For this reason, the pressure equalization line is provided, which is fluidically connected between the fluid tank and the filling line. The pressure equalization line is used to produce a pressure equalization between the fluid tank and the filling line. In particular, the air displaced by the decanting of the fluid escapes from the fluid tank and enters the filling line through the pressure equalization line. The pressure equalization line preferably opens in this case out of the fluid tank and/or into the filling line in such a way that the air overflowing from the fluid tank into the pressure equalization line or from the pressure equalization line into the filling line, respectively, does not effectuate entraining of the fuel in the direction facing away from the fluid tank.

Typically, the filling line opens into the fluid tank below the pressure equalization line with respect to an installation location of the fluid tank arrangement. For example, the pressure equalization line opens into the fluid tank through a tank roof thereof, so that the pressure equalization line thus opens into the fluid tank at a geodetic uppermost point in the installation location of the fluid tank assembly and/or is fluidically connected thereto at this point. For this reason, the air displaced by the decanting of the fluid can be conducted out through the pressure equalization line even when the fluid tank is already substantially filled.

The fill level valve is fluidically arranged between the pressure equalization line and the fluid tank. In other words, the pressure equalization line is thus fluidically connected to the fluid tank via the fill level valve. The fill level valve is designed in such a way that it at least partially closes or blocks the pressure equalization line if a defined fill level in the fluid tank is exceeded, so that no or only a restricted pressure equalization takes place between the fluid tank and the filling line via the pressure equalization line. The fill level valve can thus also be referred to as a fill-level-controlled shutoff valve. For this purpose, the English term "fill limit valve" is also typical. The fluid is provided in any case as a liquid. For example, a fuel, for example, gasoline or diesel, or another process material, for example, a reducing agent or a reducing agent solution, is used as a fluid.

Conventional dispensing devices are designed in such a way that in the event of an interruption of the pressure equalization between the fluid tank and the filling line via the pressure equalization line, the supply of fluid into the fluid tank is interrupted. For this purpose, according to a surprising finding underlying the invention, it is initially sufficient for the pressure equalization to be obstructed sufficiently strongly, a complete interruption of the pressure equalization is not necessary. According to the invention, it is therefore provided that the flow resistance formed by the constricted through-flow cross section is arranged in the dip tube.

The dip tube originates from the connecting piece and can be arranged at least in regions, in particular completely, in the fluid tank. For example, the dip tube is introduced through a tank opening into the fluid tank, namely preferably in such a way that the connecting piece is provided outside the fluid tank and the dip tube originating from the connecting piece extends into the fluid tank. The connecting piece is preferably provided for connecting the pressure equalization line to the fill level valve. However, it can also be provided that the connecting piece is part of the pressure equalization line, so that the pressure equalization line is integrally formed with the fill level valve.

The dip tube is dimensioned such that it dips into the fluid if a defined fluid level is reached or exceeded by the presently existing fluid level. If the fluid level in the fluid tank rises further, the air present in the fluid tank outside the dip tube is thus compressed. A pressure compensation is possible solely in the dip tube, which is fluidically connected via the pressure equalization line to the filling line. For this reason, the fluid level rises faster or even substantially faster in the dip tube upon further filling than outside the dip tube.

The flow resistance formed by the constricted flow cross section is arranged in the dip tube. The flow resistance can be designed as desired in principle, for example, it is provided as an aperture, throttle, or nozzle. It is distinguished by the through-flow cross section, which is constricted in comparison to a directly adjacent region of the dip tube. Such a flow resistance has a strongly media-dependent pressure loss. In particular, the pressure loss of the flow resistance is dependent on viscosity. This means that the flow resistance opposes the air exiting from the fluid tank with a significantly lower flow resistance than the fluid, which has a greater viscosity than the air.

If the fluid rising in the dip tube reaches the flow resistance, for example, if a maximum desired fluid level is reached in the fluid tank by the presently existing fluid level, the pressure loss via the flow resistance thus rises abruptly, so that venting of the fluid tank via the pressure equalization line is nearly completely suppressed. However, at least the mass flow of the flow through the pressure equalization line is significantly reduced from this point in time. This results in an increase of the fluid level in the filling line and a shutdown of the dispensing device.

The described design of the fill level valve is, on the one hand, implementable extremely easily. On the other hand, beyond the described advantages, it offers the option of uncomplicated adaptation to another fluid and/or to different fluids. Due to the different densities of different fluids, it can be necessary to adapt the fill level valve to the respective fluid to be temporarily stored in the fluid tank. This is linked to significant expense in conventional fill level valves, because, for example, a float of the fill level valve or the entire geometry of the fill level valve is to be adapted.

BRIEF SUMMARY OF THE INVENTION

In the fill level valve according to the invention, in contrast, it is solely necessary to adapt the through-flow cross section of the flow resistance to the respective fluid or to its density and/or viscosity. The further geometry of the fill level valve remains unchanged. This means ultimately that the geometry of the fluid tank assembly as a whole remains outwardly unchanged and only the through-flow cross section of the flow resistance changes in the fill level valve.

For example, the production of the fill level valve is performed by injection molding, wherein the flow resistance is also formed, so that the flow resistance is a permanent part of the fill level valve. However, it can also be provided that the flow resistance is provided, for example, in the form of an insert, which is formed separately from a base body of the fill level valve. This insert is subsequently introduced into the base body of the fill level valve, to produce the fill level valve. By appropriate selection of the insert, the fill level valve can be adapted to the fluid to be used and/or its density. The insert can be designed, for example, as an aperture insert, throttle insert, or nozzle insert.

The invention thus also relates to an assembly kit for a variety of fill level valves, wherein the assembly kit comprises a plurality of identical base bodies and also multiple different valve inserts. Each of the valve inserts has the flow resistance, wherein the flow cross sections of these flow resistances differ for the individual valve inserts. One of the valve inserts is associated with each base body and introduced therein to form the respective fill level valve.

A further design of the invention provides that the flow resistance has a smallest through-flow cross section which is smaller than the smallest through-flow cross section of the connecting piece and/or the smallest through-flow cross section of the dip tube. The smallest through-flow cross section of the respective element is to be understood as the smallest through-flow cross section existing over the entire respective element in the through-flow direction. The smallest through-flow cross section of the flow resistance is to be smaller than the smallest through-flow cross section of the connecting piece. Additionally or alternatively, it may be smaller than the smallest through-flow cross section of the dip tube. The smallest through-flow cross section of the flow resistance is particularly preferably smaller than both the smallest through-flow cross section of the connecting piece and also the smallest through-flow cross section of the dip tube. The flow resistance thus has or forms the smallest through-flow cross section in the flow direction over the entire fill level valve. With such a design of the flow resistance, a particularly clear increase of the pressure loss is achieved when the fluid reaches and/or flows through the flow resistance.

A further preferred design of the invention provides that the flow resistance is formed by a ring web, which has a longitudinal center axis arranged in parallel with respect to a longitudinal center axis of the dip tube. The ring web thus forms a constriction of the flow path through the fill level valve. Such a design of the flow resistance is extremely simple to implement. A free end of the ring web delimiting the through-flow cross section of the flow resistance can fundamentally be shaped arbitrarily viewed in longitudinal section with respect to the longitudinal center axis. A surface of the free ends of the ring web delimiting the flow resistance is particularly preferably located on the lateral surface of an imaginary cylinder, in particular of an imaginary circular cylinder. This means that the flow resistance is formed like an aperture or a throttle.

Alternatively, for the design of the flow resistance as a nozzle, a curved surface of the free end of the ring web can also be provided. The longitudinal center axis of the ring web and/or the flow resistance extends in parallel to the longitudinal center axis of the dip tube. The two longitudinal center axes particularly preferably coincide, so that the flow resistance is arranged centrally with respect to the dip tube. In this way, particularly reliable venting and also reliable generation of a high pressure loss in the case of the fluid reaching the flow resistance are effectuated.

A further embodiment of the invention provides that a float is displaceably mounted on the dip tube, which, in a first position, is provided spaced apart from the valve seat to release a fluidic connection through a valve seat and, in a second position, interacts with the valve seat, in particular abuts against the valve seat, to interrupt the fluidic connection through the valve seat. The float is provided in particular if, in the case of filled fluid tank and/or low filling speed and/or a thermal expansion of the fluid, not only the pressure loss via the flow resistance and/or the fill level valve is to be increased, but rather a complete interruption of the fluidic connection through the fill level valve is provided. With the aid of the float, an exit of the fluid through the fill level valve into the pressure equalization line can be prevented particularly reliably.

The float is designed in such a way that it has a lower density than the fluid which is to be temporarily stored in the fluid tank. If the fluid thus reaches the float, it thus entrains the float as the fluid level rises further and displaces it out of the first position in the direction of the second position, which is thus above the first position viewed geodetically in the installation location of the fill level valve. If a defined fluid level is reached in the fluid tank, the fluid displaces the float into the second position, so that the fluidic connection through the valve seat is interrupted by the interaction of the valve seat with the float.

The float is displaceably mounted on and/or in the dip tube. In the first position, the float is arranged spaced apart from the valve seat, so that a fluidic connection through the valve seat is released, in particular is completely released. In the second position, in contrast, the float interacts with the valve seat to interrupt the fluidic connection. Preferably, it is provided for this purpose that the float abuts against the valve seat in the second position in order to close it, so that the fluidic connection is interrupted. The valve seat is fluidically located between a fluid tank interior of the fluid tank and the pressure equalization line, therefore in the fill level valve.

In the scope of a further preferred design of the invention, it can be provided that the valve seat, viewed in longitudinal section, is formed by an axial web, which originates in particular from the ring web and which protrudes in the axial direction into the dip tube and is arranged spaced apart from an inner circumference of the dip tube. The axial web thus extends in the axial direction into the dip tube, for example, originating from an end face of the dip tube. The axial web is preferably formed continuously in the circumferential direction with respect to the longitudinal center axis of the dip tube to form the valve seat.

The axial web is formed in such a way that the float preferably presses continuously against the axial web in the circumferential direction in its second position in order to interrupt the fluidic connection through the valve seat. The axial web particularly preferably originates from the ring web, i.e., it is thus formed jointly with it. The valve seat is thus located in the dip tube viewed fluidically. For example, the valve seat is formed on the side of the dip tube facing toward the connecting piece.

One preferred further design of the invention provides that the float is arranged in the first position in a guide cage fastened on the dip tube or formed by the dip tube, via which the connecting piece has a fluidic connection to a fluid tank interior of the fluid tank after the dip tube is arranged in the fluid tank. The guide cage is used to guide the float, in particular a linear guide of the float between the first position and the second position. The guide cage is preferably formed in such a way that it guides the float in the axial direction with respect to the longitudinal center axis of the dip tube. The guide cage can either be fastened to the dip tube or formed thereby. In the first case, the guide cage is provided as an element separate from the dip tube, while in contrast in the latter case it is part of the dip tube.

The guide cage is formed to be fluid-permeable. Moreover, it is fluidically arranged between the connecting piece and the fluid tank in a chamber of the fluid tank. Accordingly, the connecting piece is fluidically connected to the fluid tank interior via the guide cage after the dip tube is arranged in the fluid tank. If the guide cage is provided as an element separate from the dip tube, it is thus provided, for example, that the guide cage is connected to the dip tube in a latching manner. This means that the guide cage and the dip tube have latching means, by means of which a preferably detachable connection of the guide cage on the dip tube can be effectuated. Alternatively, the guide cage can also be formed in one piece with the dip tube. In this case, the guide cage is additionally preferably formed of the same material as the dip tube.

One refinement of the invention provides that the float comprises a cavity on its side facing away from the valve seat, which is open in the direction facing away from the valve seat. The cavity ensures a particularly low density of the float, so that it reliably floats on the fluid. The cavity is open on the bottom, i.e., in the direction facing away from the valve seat, viewed geodetically in the installed location of the fill level valve, If the rising fluid reaches the float, the orifice opening of the cavity is thus first closed by the fluid, so that the air present in the cavity can no longer escape therefrom. As the fluid level rises further, the float is displaced by the fluid in the direction of the valve seat, in particular due to the air present in the cavity and the low overall density of the float resulting therefrom.

A design of the invention is preferred, according to which a lateral surface of the float comprises at least one peripherally-open slot opening into the cavity. The lateral surface is to be understood as a surface or wall delimiting the cavity outward in the radial direction. The slot is provided in the lateral surface, which slot extends completely through the lateral surface in the radial direction, so that the slot opens on one side into the cavity and engages completely through the lateral surface in the outward radial direction. The slot is designed to be peripherally open, namely in the direction facing away from the valve seat. Accordingly, the slot extends through a periphery of the float which faces away from the slot. The float can be adjusted in a simple manner to the respective fluid to be used or its density by way of the extension of the slot in the axial direction.

A further embodiment of the invention provides that a lateral surface of the dip tube comprises at least one peripherally-open slot in the direction facing away from the connecting piece. Such a slot can also be used to adjust the fill level valve to the fluid used or its density. The slot extends completely through a wall of the dip tube in the radial direction. The slot begins on the side of the dip tube facing away from the connecting piece and extends through it, so that the slot is formed peripherally open. A pressure equalization between the fluid tank outside the dip tube and the filling line can also take place via the pressure equalization line via this slot if the rising fluid has already reached the dip tube or its lower end. The provision of the slot enables the adjustment of the fill level valve without changes to the geometry of the fill level valve, in particular the external geometry of the fill level valve.

A further embodiment of the invention provides that the float has vanes for mounting, which originate from a base body of the float, wherein the vanes are designed to space the base body apart from the inner circumference of the dip tube. The float thus comprises the base body and the vanes, wherein the vanes extend outward in the radial direction originating from the base body. The base body is dimensioned such that it is smaller in the radial direction than the internal dimensions of the dip tube. Accordingly, it can be spaced apart by the vanes from the inner circumference of the dip tube. The vanes are preferably designed and arranged such that they space apart the base body uniformly from the inner circumference of the dip tube, so that the distance of the base body from the inner circumference of the dip tube in the circumferential direction does not change or at least does not change substantially. For example, at least four vanes are provided for this purpose, which are arranged distributed uniformly over the circumference of the base body. Such a design of the float enables particularly simple mounting thereof, wherein it is ensured simultaneously that air and fluid can readily pass the float, in particular as long as it is provided outside its second position.

One refinement of the invention provides that the float supports itself on a bottom plate in the first position, which is arranged on the dip tube on the side facing away from the connecting piece. The bottom plate thus comprises a standing surface for the float, which forms an end stop for the float. For example, the float is displaced in the installation location of the fill level valve by an influence of gravity acting thereon in the direction of the bottom plate and/or thereon. The bottom plate is arranged on the dip tube on the side facing away from the connecting piece, in particular on the end of the dip tube facing away from the connecting piece.

It is preferably provided that the bottom plate comprises a structured standing surface for the float. The presence of the standing surface on the bottom plate has already been indicated. To prevent adhesion of the float on the bottom plate as the fluid level rises, the standing surface is to be structured. This is to be understood to mean that the standing surface is, for example, ribbed or studded. It can also comprise any other surface structure which is capable of preventing adhesion of the float on the standing surface.

Finally, it can be provided in the scope of a further preferred design of the invention that a recess extending through the bottom plate forms the flow resistance. This finally means that the flow resistance is arranged upstream from the float with respect to a through-flow direction of the fill level valve proceeding from the fluid tank in the direction of the connecting piece. In such a design, a comparatively slow raising of the float is implemented, because the rising fluid has to pass the flow resistance before it can raise the float. Due to the reaching of the flow resistance by the fluid, the pressure loss via the fill level valve is thus already increased such that the dispensing device interrupts the filling of the fluid tank. The fluidic connection through the fill level valve is only completely interrupted by means of the float upon further rising of the fluid level in the fluid tank, for example, due to forced filling of the fluid tank or in the event of a defective dispensing device. This ensures a particularly high level of functional reliability of the fill level valve.

Particularly preferably, it is provided that an imaginary extension of the recess extends spaced apart from the float. If air and/or fluid flows through the recess, raising of the float can occur if the air or the fluid strikes the float directly. Accordingly, the recess is to be arranged in such a way that the air passing through it or the fluid passing through it does not strike the float. This is implemented by the spaced-apart arrangement of the imaginary extension of the recess from the float.

Furthermore, it can be provided in the scope of a further design of the invention that for mounting the float, guide webs originate from the bottom plate, which press against an outer circumference of the float or an inner circumference of the float delimiting the cavity at least in the first position of the float. In such a design of the fill level valve, mounting of the float by means of the vanes can be omitted. Rather, only the guide webs are provided. They are preferably arranged uniformly distributed in the circumferential direction.

For example, at least four guide webs are provided. The guide webs originate from the bottom plate and extend in the direction of the connecting piece and thus into the dip tube. They are designed and/or arranged in such a way that they press against the outer circumference or the inner circumference of the float at least in the first position. The application to the outer circumference enables particularly reliable and tilt-free guiding of the float, while in contrast the application to the inner circumference implements particularly space-saving mounting.

The invention furthermore relates to a fluid tank assembly, having a fluid tank, a filling line opening into the fluid tank at an orifice point, and a pressure equalization line, which, spaced apart from the orifice point, is fluidically connected to the fluid tank, on the one hand, and opens into the filling line, on the other hand, wherein the pressure equalization line is connected via a fill level valve, in particular a fill level valve according to the statements in the scope of this description, to the fluid tank, which comprises a connecting piece arranged on the fluid tank. Is provided in this case that a dip tube, which is arranged in the fluid tank and is fluidically connected to the connecting piece, originates from the connecting piece, wherein a flow resistance formed by a constricted through-flow cross section is provided in the dip tube.

The advantages of such a design of the fill level valve and/or the fluid tank assembly have already been noted. Both the fluid tank assembly and the fill level valve can be refined according to the statements in the scope of this description, so that reference is thus made thereto.

BRIEF DESCRIPTION OF THE DRAWINGS

The invention is explained in greater detail hereafter with the aid of the exemplary embodiments illustrated in the drawing, without a restriction of the invention taking place. In the figures.

DESCRIPTION OF EXAMPLE EMBODIMENTS

Figure 1:
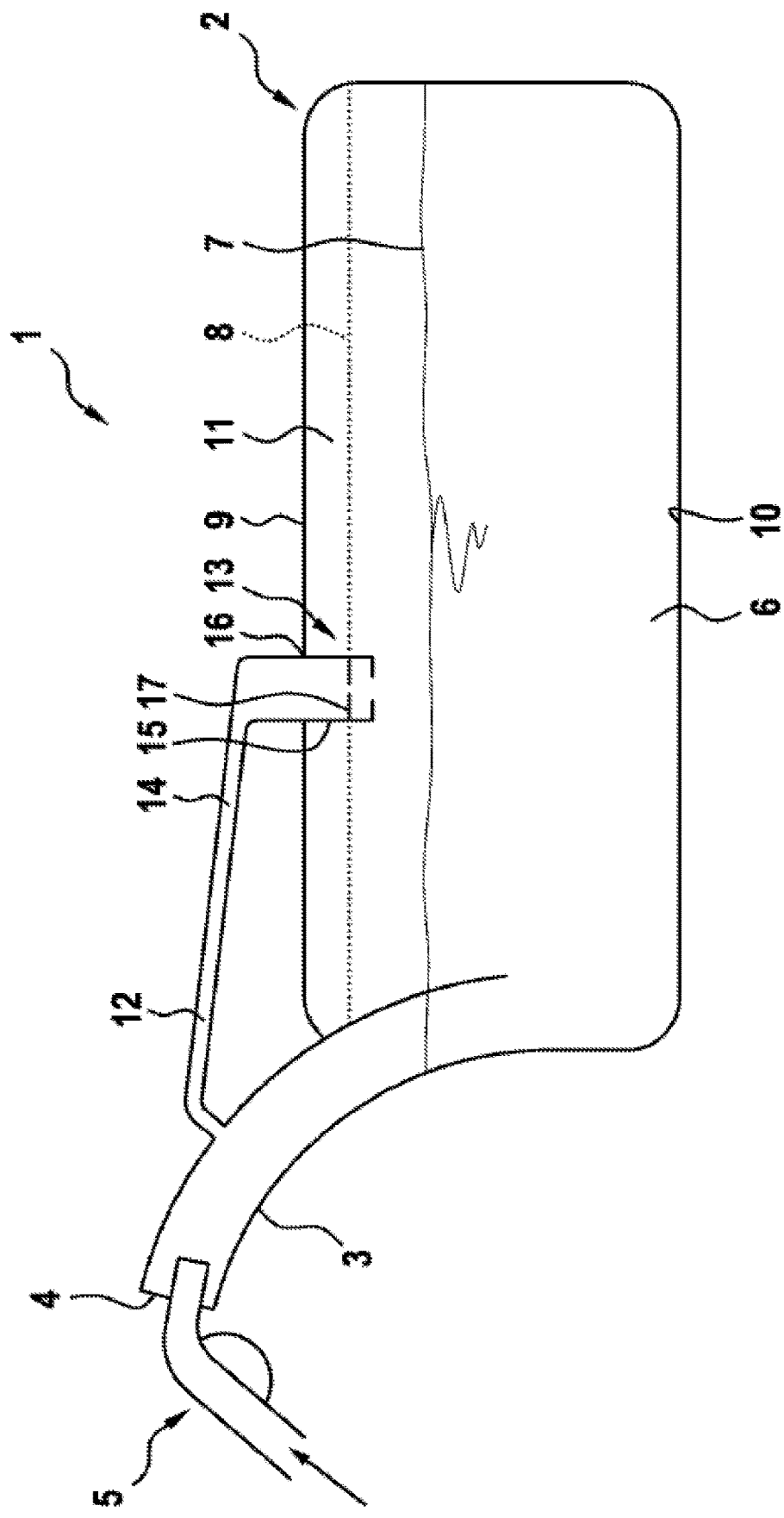
FIG. 1 shows a schematic sectional illustration through a fluid tank assembly, which comprises a fluid tank, a filling line, a pressure equalization line, and a fill level valve.

FIG. 1 shows a schematic illustration of a fluid tank assembly 1, which comprises a fluid tank 2, to which a filling line 3 is fluidically connected. The filling line 3 comprises, on its side facing away from the fluid tank 2, a filling nozzle 4, which is provided and formed to accommodate a dispensing device 5. By means of the dispensing device 5, a fluid 6 can be introduced into the fluid tank 2 through the filling line 3. Solely by way of example, a fluid level 7 of the fluid 6 in the fluid tank 2 is indicated. A maximum permissible fluid level 8 is also shown. It is apparent that the filling line 3 opens into the fluid tank 2 spaced apart from a tank roof 9 and a tank bottom 10, for example, centrally between the tank roof 9 and the tank bottom 10.

During filling of the fluid tank 2 through the filling line 3, the fluid level 7 rises in the fluid tank 2. Air 11 located in the fluid tank 2 is displaced by the fluid 6. However, because the filling line 3 opens into the fluid tank 2 spaced apart from the tank roof 9, the air 11 can no longer escape through the filling line 3 from a specific fluid level 7. For this reason, the pressure equalization line 12 is provided, which is fluidically connected to the filling line 3 and the fluid tank 2. The pressure equalization line 12 preferably opens into the fluid tank 2 through the tank roof 9, so that the air 11 can escape through the pressure equalization line 12 from the fluid tank 2 even at a very high fluid level 7.

In order to prevent overfilling of the fluid tank 2 with the fluid 6, the pressure equalization line 12 is fluidically connected via a fill level valve 13 to the fluid tank 2. The fill level valve 13 is designed in such a way that it obstructs or even entirely prevents venting of the fluid tank 2 upon reaching a specific fluid level 7, which corresponds, for example, to the fluid level 8. This is determined by the dispensing device 5, whereupon it ends the filling of the fluid tank 2 with fluid 6. For this purpose, the dispensing device 5 is designed accordingly.

The fill level valve 13 has a connecting piece 14, to which the filling line 3 is connected or which forms a part of the filling line 3. The connecting piece 14 is arranged outside the fluid tank 2, preferably completely. A dip tube 15 originates from the connecting piece 14, which protrudes into the fluid tank 2, for example, through a corresponding tank opening 16. The dip tube 15 is fluidically connected to the connecting piece 14 and thus to the pressure equalization line 12. If the fluid 6 is provided spaced apart from the dip tube 15 in the fluid tank 2, because the fluid level 7 is sufficiently low, during the filling of the fluid tank 2 with fluid 6, the displaced air from the fluid tank 2 can thus escape from the fluid tank 2 through the dip tube 15 and/or the fill level valve 13 out of the fluid tank 2.

If the fluid 6 has reached the dip tube 15, the air 11 present outside the dip tube 15 in the fluid tank 2 can no longer escape. Only the air 11 still contained in the dip tube 15 can flow through the pressure equalization line 12 in the direction of the filling line 3. As a result, the fluid 6 in the dip tube 15 rises faster than in the fluid tank 2 outside the dip tube 15. To achieve reliable ending of the filling of the fluid tank 2 and/or a reliable shutdown of the dispensing device 5, a flow resistance 17, which is indicated here as an aperture, is formed in the dip tube 15.

Such a flow resistance 17 has a pressure loss, which is strongly dependent on the viscosity of the medium flowing through it. This finally means that the flow resistance 17 represents a significantly lower resistance for the air 11 than for the fluid 6. In other words, the air 11 can pass the flow resistance 17 nearly unimpeded. However, if the fluid 6 reaches the flow resistance 17, the pressure loss thus increases abruptly and significantly. Accordingly, upon the fluid 6 reaching the flow resistance 17, the venting of the fluid tank 2 through the fill level valve 13 is nearly completely prevented or at least significantly restricted. This is recognized by the dispensing device 5, which thereupon stops the filling of the fluid tank 2 with fluid 6.

Figure 2:
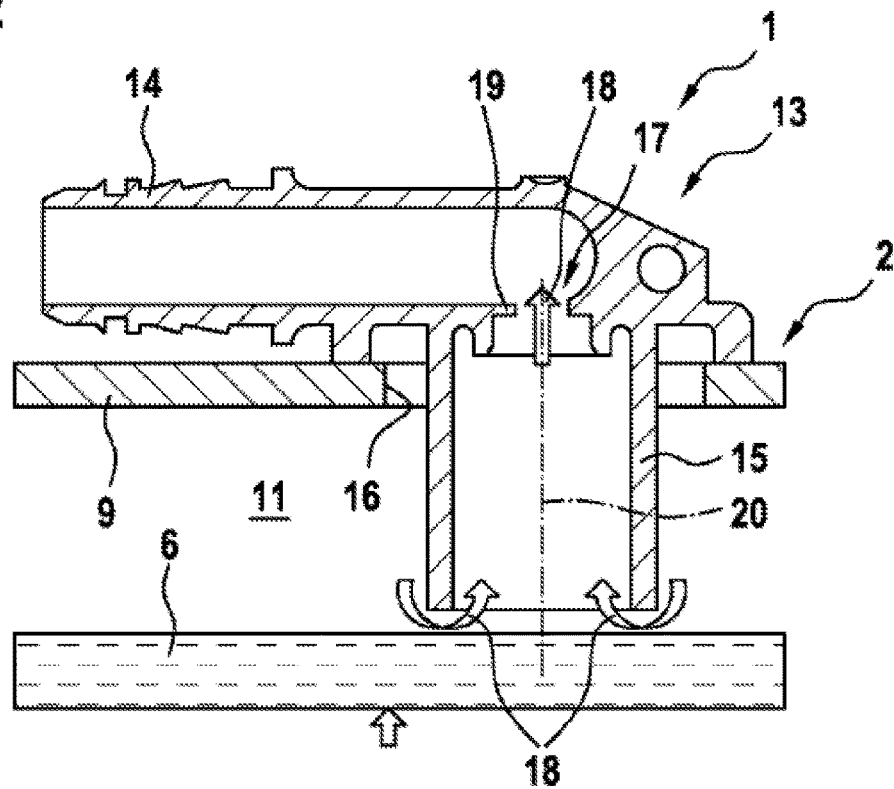
FIG. 2 shows a schematic sectional illustration through a region of the fluid tank assembly, wherein the fill level valve is provided in a first embodiment.

FIG. 2 shows a schematic sectional illustration through a region of the fluid tank assembly 1, wherein the fill level valve 13 is provided in the above-described first embodiment. A fluid level 7 is shown, in which the fluid 6 is provided spaced apart from the dip tube 15. Accordingly, the air 11 can readily escape through the flow resistance 17 out of the fluid tank 2 as indicated by the arrows 18. It is apparent that the flow resistance 17 has a smallest through-flow cross section which is smaller than the smallest through-flow cross section of the connecting piece 14 and than the smallest through-flow cross section of the dip tube 15. For example, the smallest through-flow cross section of the flow resistance 17 is at most 10%, at most 15%, at most 20%, or at most 25% in relation to the smallest through-flow cross section of the dip tube 15.

The flow resistance 17 solely represents a temporary constriction of the flow path in any case. This means that both the through-flow cross section of the connecting piece 14 and also the through-flow cross section of the dip tube 15 are larger than the smallest through-flow cross section of the flow resistance 17. Preferably, in this case the (minimal) through-flow cross section of the dip tube 15 is larger than the (minimal) through-flow cross section of the connecting piece 14, for example, by at least 25%, at least 50%, at least 75%, or at least 100% or more. The flow resistance 17 is formed by a ring web 19, which has a longitudinal center axis arranged in parallel with respect to a longitudinal center axis 20 of the dip tube 15. Preferably, the flow resistance 17 is arranged centrally with respect to the longitudinal center axis 20.

Figure 3:
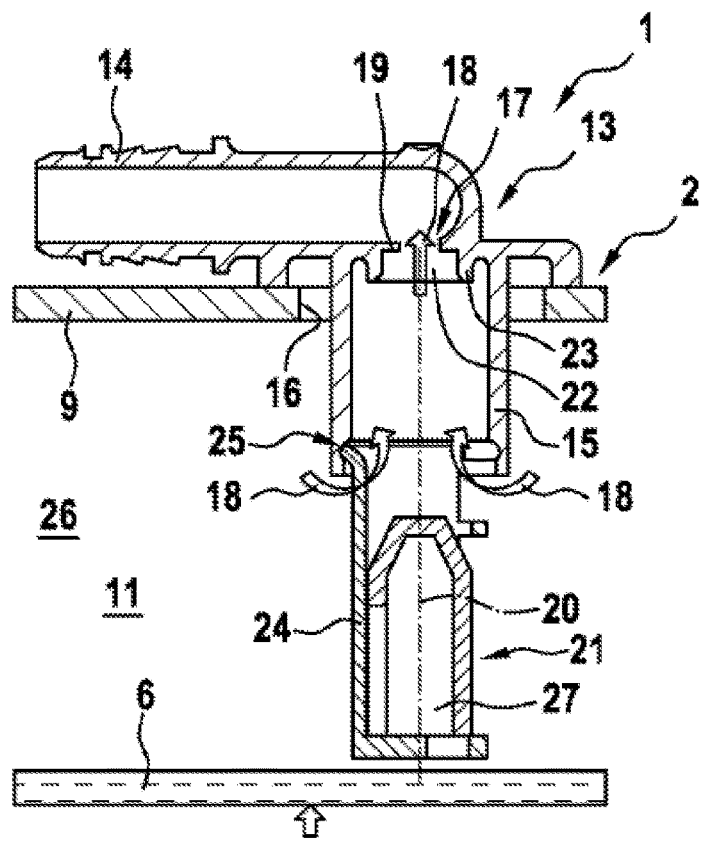
FIG. 3 shows a schematic sectional illustration through a region of the fluid tank assembly, wherein the fill level valve is provided in a second embodiment and comprises a float.

FIG. 3 shows a schematic sectional illustration through a region of the fluid tank assembly 1, wherein the fill level valve 13 is provided in a second embodiment. Reference is made in principle to the statements relating to the first embodiment. In addition thereto, the fill level valve 13 of the second embodiment has a float 21, which is displaceably mounted on the dip tube 15. The float 21 is designed in such a way that in the first position shown here, it is provided spaced apart from the valve seat 22 to release a fluidic connection through a valve seat 22. In a second position of the float 21, in contrast, it interacts with the valve seat to interrupt the fluidic connection through the valve seat 22, preferably in that it abuts against the valve seat 22.

The valve seat 22 is formed in the exemplary embodiment illustrated here by an axial web 23, which extends toward the float 21 in the axial direction originating from the ring web 19. The axial web 23 is formed continuously in the circumferential direction to form the valve seat 22, so that the float 21, in its second position, interacts continuously in the circumferential direction to form a seal on the axial web 23 to interrupt the fluidic connection through the valve seat 22. The float 21 is displaceably mounted in a guide cage 24, wherein the guide cage 24 is connected in a latching manner to the dip tube 15. Corresponding latching means 25 are provided for this purpose. The guide cage 24 is fluid permeable, so that finally the connecting piece 14 has a fluidic connection via the guide cage 24 and the dip tube 15 to a tank interior 26, in which the fluid 6 and the air 11 are provided.

A fluid level 7 is shown in which the fluid 6 is provided spaced apart from the dip tube 15 and additionally spaced apart from the float 21. Accordingly, the air 11 can flow through the valve seat 22 and the flow resistance 17 as indicated by the arrows 18 and enter the connecting piece 14. If the fluid 6 reaches the float 21, the fluid 6 thus begins to raise the float 21. This is in particular due to a cavity 27 formed in the float 21, which is filled with air and accordingly ensures a low overall density of the float 21. The cavity 27 is open in the direction facing away from the valve seat 22. If the fluid 6 thus reaches the float 21, it thus firstly closes the cavity 27, so that the air located therein can no longer escape from the cavity 27, and displaces the float 21 in the direction of the valve seat 22.

If the fluid 6 additionally reaches the dip tube 15, it thus rises more rapidly therein than outside the dip tube 15. The float 21 is accordingly also displaced more rapidly in the direction of the valve seat 22. If the float 21 has reached the valve seat 22, the flow path through the fill level valve 13 is thus completely interrupted. It can be provided that the fluid 6 reaches the flow resistance 17 before the float 21 interacts with the valve seat 22 to interrupt the fluidic connection through the fill level valve 13. Accordingly, the flow resistance through the fill level valve 13 is already increased at this point in time in such a way that the dispensing device 5 ends the filling of the fluid tank 2.

Figure 4:
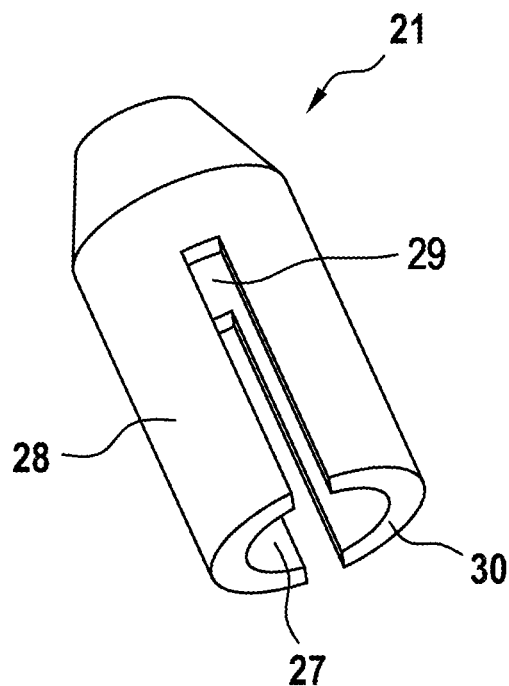
FIG. 4 shows a schematic sectional partial illustration of the float.

FIG. 4 shows a schematic illustration of the float 21. It is clear that at least one slot 29 (in the exemplary embodiment illustrated here: two slots 29) are formed in a lateral surface 28 of the float 21. The at least one slot 29 extends through the lateral surface 28 completely in the radial direction, thus opens into the cavity 27. The slot 29 is moreover formed peripherally open, for this purpose it extends through a lower periphery 30 of the float 21 and/or the lateral surface 28. By changing the periphery 30, the float 21 can be adapted in a simple manner to the fluid 6 used and/or the density of the fluid 6.

Figure 5:
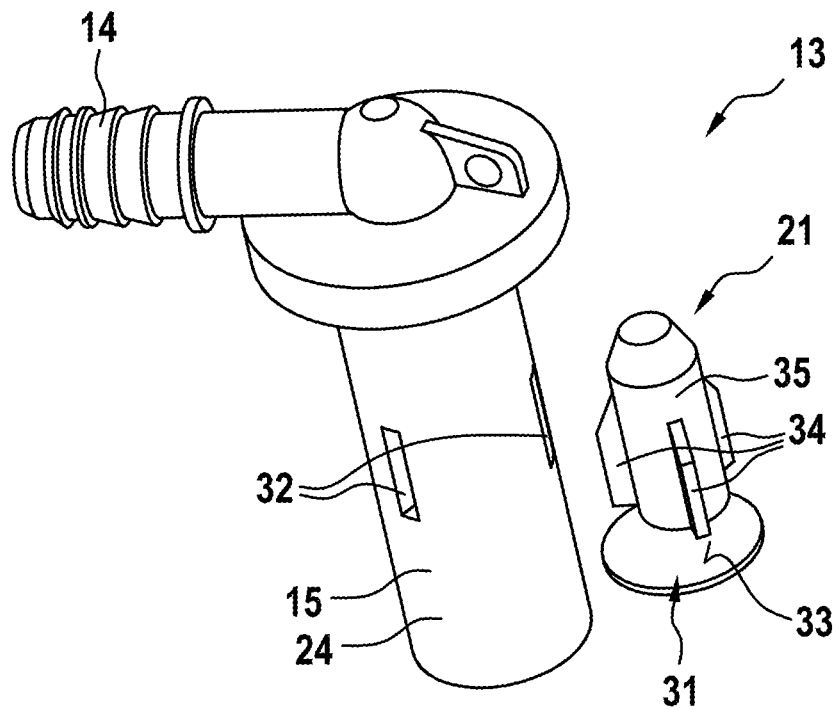
FIG. 5 shows a schematic illustration of the fill level valve in a third embodiment.

FIG. 5 shows a schematic illustration of the fill level valve 13 in a third embodiment. Reference is again made to the above statements and only the differences are discussed hereafter. These are that the guide cage 24 is formed by the dip tube 15. The dip tube 15 is closed on its side facing away from the connecting piece 14 using a bottom plate 31. For this reason, the dip tube 15 has at least one fluid opening 32, preferably multiple fluid openings 32. Fluid 6 and air 11 can flow out of the tank interior 26 in the direction of the connecting piece 14 via the fluid opening 32, as long as the float 21 is provided spaced apart from the valve seat 22, which is not apparent here.

The bottom plate 31 comprises a standing surface 33 for the float 21, on which it is seated in its first position. The standing surface 33 is preferably structured to prevent adhesion of the float 21 on the standing surface 23. A guide of the float 21 is achieved by means of multiple vanes 34, which originate from a base body 35 of the float 21 and extend outward in the radial direction. The vanes 34 are designed in such a way that they press against an inner circumference 36 (not apparent here) of the dip tube 15 to guide the float 21.

Figure 6:
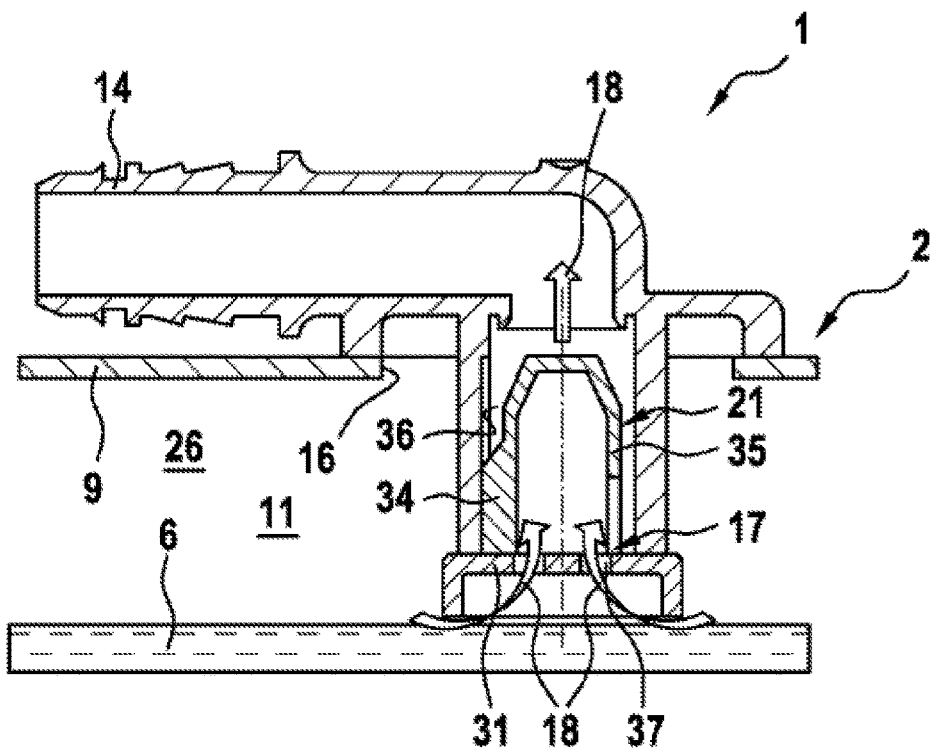
FIG. 6 shows a sectional illustration through a region of the fluid tank assembly, wherein the fill level valve is provided in a fourth embodiment.

FIG. 6 shows a schematic sectional illustration through a region of the fluid tank assembly 1, wherein the fill level valve 13 is provided in a fourth embodiment, Reference is again made to the above statements and the differences are discussed hereafter. These are that the flow resistance 17 is now formed by a recess 37, which extends through the bottom plate 31. A plurality of these recesses 37 are preferably formed in the bottom plate 31.

Figure 7:
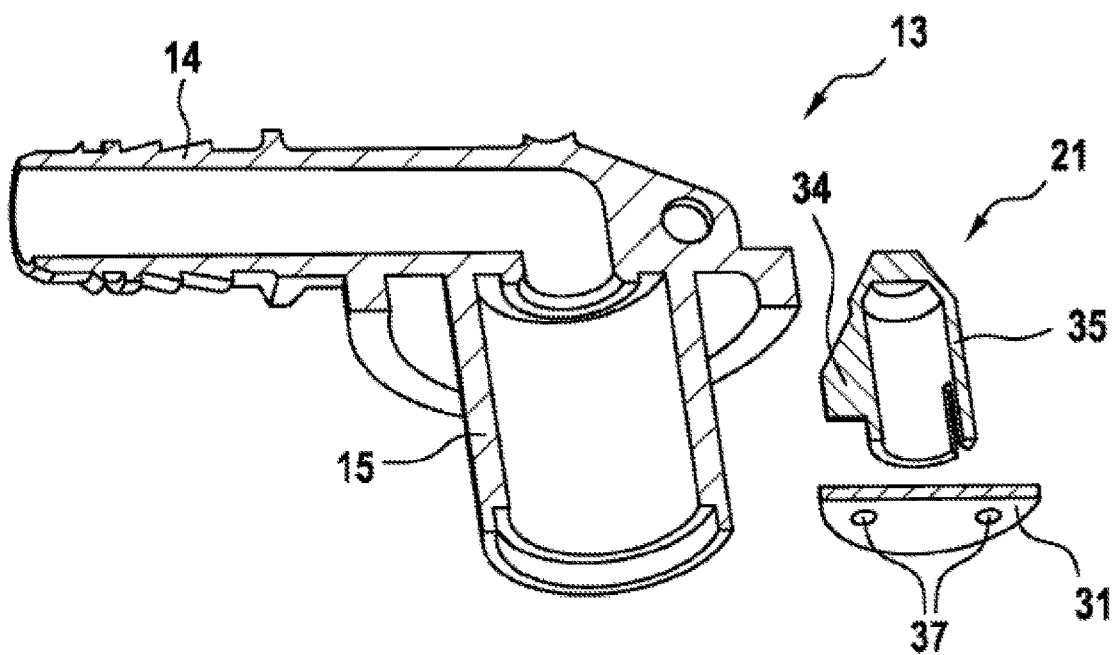
FIG. 7 shows a schematic sectional illustration of the fill level valve in a fifth embodiment.

FIG. 7 shows a schematic sectional illustration of a fifth embodiment of the fill level valve 13. This differs from the one described above solely by way of the design of the bottom plate 31, so that reference is again made to the above statements. It is clear that the recesses 37 in the bottom plate 31 are arranged in such a way that imaginary extensions of the recesses 37 extend spaced apart from the float 21 or at least its base body 35. Due to this design of the bottom plate 31, influencing of the float 21 by air 11 passing through the recesses 37 and/or passage of the fluid 6 is substantially avoided.

Figure 8:
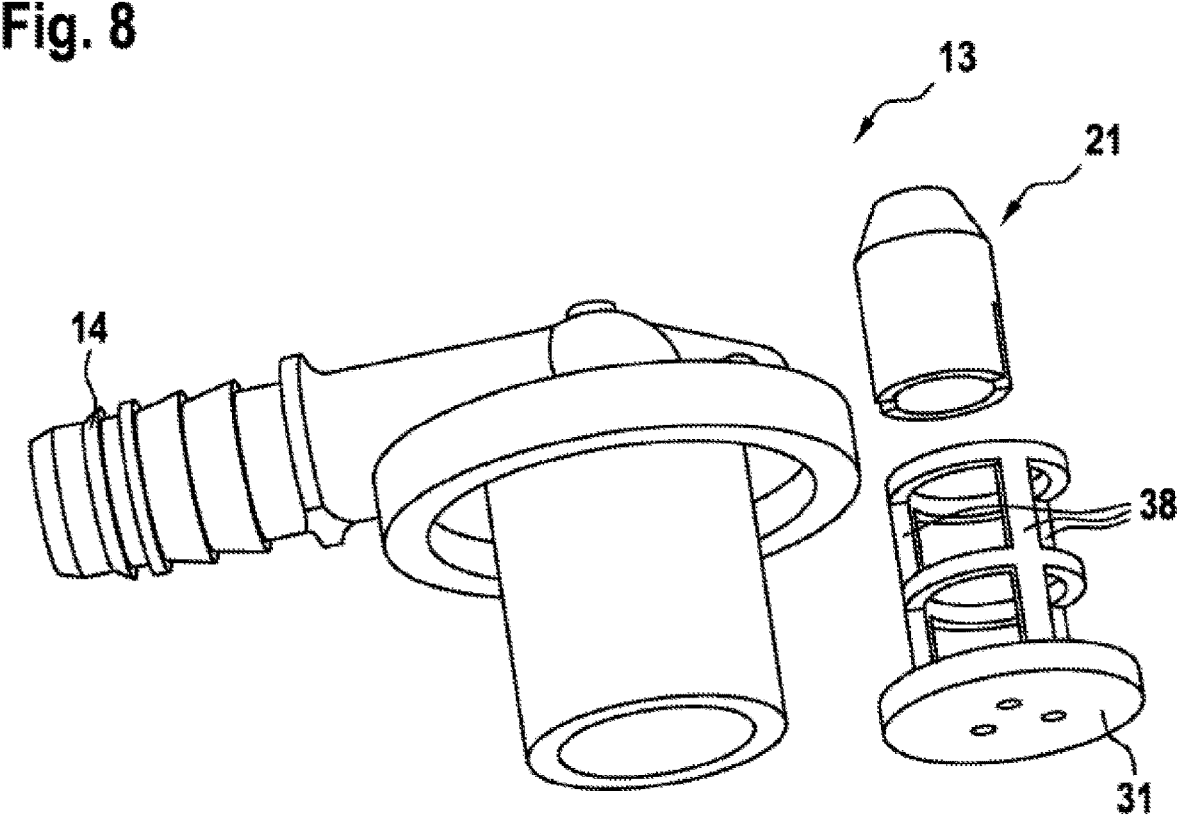
FIG. 8 shows a schematic illustration of the fill level valve in a sixth embodiment.

FIG. 8 shows a schematic illustration of the fill level valve 13 in a sixth embodiment. Reference is made to the above statements and only the differences are indicated hereafter. These are in the guide of the float 21. This no longer takes place by means of the vanes 34, which are accordingly completely omitted. Instead, guide webs 38 originate from the bottom plate 31, which enclose the float 21 in a guiding manner at least in its first position, but preferably permanently, and accordingly press against it. The bottom plate 31 is arranged during an installation of the fill level valve 13 in such a way that the guide webs 38 are accommodated in the dip tube 15. The bottom plate 31 thus again closes the dip tube 15 on its side facing away from the connecting piece 14.

Figure 9:
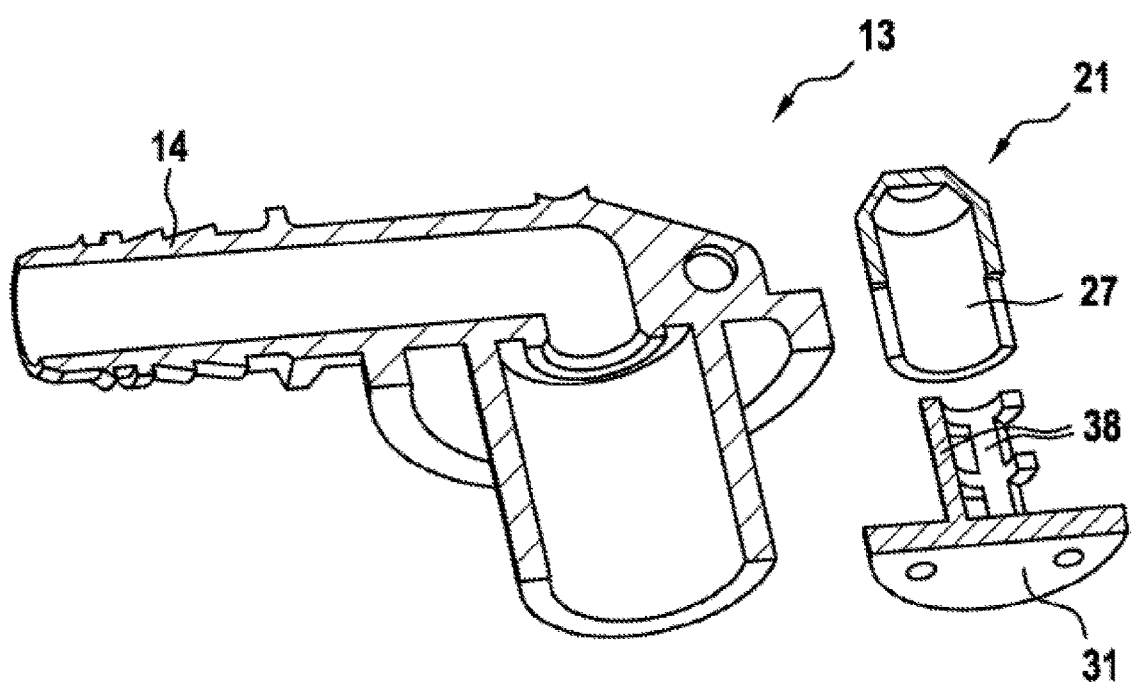
FIG. 9 shows a schematic sectional illustration of the fill level valve in a seventh embodiment.

FIG. 9 shows a schematic illustration of a seventh embodiment of the fill level valve 13. Reference is made to the above statements and only the differences are discussed hereafter. These are again in the guide of the float 21. In contrast to the above-described embodiment, the guide webs 38 originating from the bottom plate 31 no longer press against an outer circumference of the float 21, but rather against an inner circumference, which delimits the cavity 27 outward in the radial direction. This enables an extremely space-saving implementation of the guide. The bottom plate 31 is in turn fastened on the dip tube 15 in such a way that the bottom plate 31 closes it on the side facing away from the connecting piece 14 and the guide webs 38 are accommodated in the dip tube 15.

The described designs of the fill level valve 13 all enable particularly simple adjustment of the fill level valve 13 to the respective fluid 6 used and/or its density. In particular, the adaptation can take place without a change of the external geometry of the fill level valve 13 and particularly preferably without a change of the external geometry of the fluid tank assembly 1. The fill level valve 13 is accordingly usable extremely universally.

The invention claimed is:

1. A fill level valve for a pressure equalization line of a fluid tank assembly, wherein
    the pressure equalization line is fluidically connected between a fluid tank and a filling line opening into the fluid tank, wherein
    the fill level valve comprises a connecting piece which can be arranged on the fluid tank, from which a dip tube, which is configured to be arranged in the fluid tank, and which is fluidically connected to the connecting piece, originates from the connecting piece, wherein
    a flow resistance formed by a constricted flow cross section is provided in the dip tube, wherein
    the fill level valve is designed so that upon fluid reaching the dip tube, due to a pressure equalization only possible in the dip tube, upon further decanting of fluid into the fluid tank, a fluid level rises faster in the dip tube than outside the dip tube, and the fluid reaches the flow resistance before a float interacts with a valve seat to interrupt the fluidic connection through the fill level valve, so that a pressure loss via the fill level valve increases, upon the fluid reaching the flow resistance, to suppress or restrict a venting of the fluid tank through the fill level valve.

2. The fill level valve as claimed in claim 1, wherein the flow resistance has a smallest through-flow cross section which is smaller than the smallest through-flow cross section of the connecting piece and/or the smallest through-flow cross section of the dip tube.

3. The fill level valve as claimed in claim 1, wherein the flow resistance is formed by a ring web, which has a longitudinal center axis arranged in parallel with respect to a longitudinal center axis of the dip tube.

4. The fill level valve as claimed in claim 1, wherein the float is displaceably mounted on the dip tube, which is provided spaced apart from the valve seat in a first position to release a fluidic connection through the valve seat and interacts with the valve seat, to abut against the valve seat, in a second position to interrupt the fluidic connection through the valve seat.

5. The fill level valve as claimed in claim 1, wherein the valve seat, viewed in longitudinal section, is formed by an axial web, which originates from the ring web and which protrudes in the axial direction into the dip tube and is arranged spaced apart from an inner circumference of the dip tube.

6. The fill level valve as claimed in claim 1, wherein the float is arranged in the first position in a guide cage fastened on the dip tube or formed by the dip tube, via which the connecting piece has a fluidic connection to a fluid tank interior of the fluid tank after the dip tube is arranged in the fluid tank.

7. The fill level valve as claimed in claim 1, wherein the float comprises a cavity, which is open in a direction facing away from the valve seat, on its side facing away from the valve seat.

8. The fill level valve as claimed in claim 1, wherein the float supports itself in the first position on a bottom plate, which is arranged on the dip tube on a side facing away from the connecting piece.

9. The fill level valve as claimed in claim 1, wherein a recess extending through the bottom plate forms the flow resistance.

10. A fluid tank assembly having a fluid tank, a filling line opening into the fluid tank at an orifice point, and a pressure equalization line, which is fluidically connected to the fluid tank spaced apart from the orifice point, and opens into the filling line, wherein the pressure equalization line is connected via a fill level valve as claimed in claim 1, to the fluid tank, which comprises a connecting piece arranged on the fluid tank.

\* \* \* \* \*